United States Patent
Yamada

(10) Patent No.: US 7,126,460 B2
(45) Date of Patent: Oct. 24, 2006

(54) SURROUNDING CONDITIONS DISPLAY APPARATUS

(75) Inventor: Keiichi Yamada, Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 959 days.

(21) Appl. No.: 10/145,042

(22) Filed: May 15, 2002

(65) Prior Publication Data
US 2002/0171739 A1    Nov. 21, 2002

(30) Foreign Application Priority Data
May 15, 2001 (JP) .............................. 2001-145616

(51) Int. Cl.
*B60Q 1/00* (2006.01)
(52) U.S. Cl. ...................... 340/435; 340/436; 340/903; 340/937
(58) Field of Classification Search ................ 340/435, 340/436, 901, 903, 995, 937; 348/135, 148, 348/149, 169; 701/208
See application file for complete search history.

(56) References Cited

U.S. PATENT DOCUMENTS 5,963,148 A * 10/1999 Sekine et al. ............... 340/905

FOREIGN PATENT DOCUMENTS

| JP | 2-299944 | 12/1990 |
|---|---|---|
| JP | 3-85069 | 4/1991 |
| JP | 9-48282 | 2/1997 |
| JP | 10-322687 | 12/1998 |
| JP | 2000-142284 | 5/2000 |
| JP | 2000-184368 | 6/2000 |
| JP | 2001-63500 | 3/2001 |
| JP | 2002-230698 | 8/2002 |

* cited by examiner

*Primary Examiner*—Daryl C Pope
(74) *Attorney, Agent, or Firm*—Oblon, Spivak, McClelland, Maier & Neustadt, P.C.

(57) ABSTRACT

A surrounding conditions display apparatus captures an image of an area surrounding a movable body and displays the captured image. The apparatus includes a CCD camera for capturing an image of the surrounding are, ultrasonic sensors for detecting a distance to an obstacle present in the surrounding area, and a liquid crystal display for displaying the image captured by the image capturing unit. A color image representing an area including the obstacle is superposed on the displayed image in such a manner that the brightness of the color image decreases with increasing distance from the origin of the area.

19 Claims, 12 Drawing Sheets

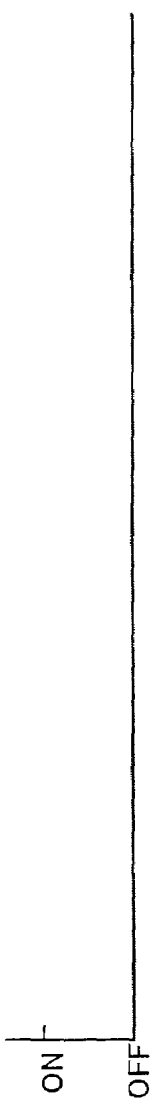
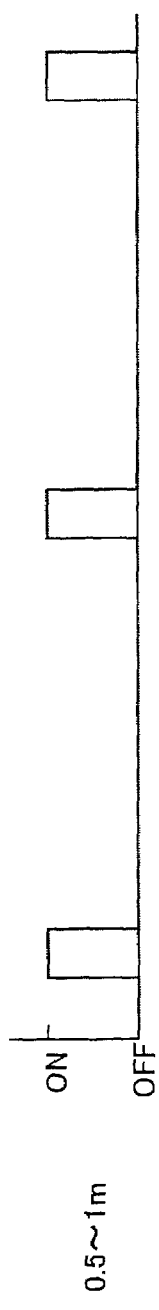
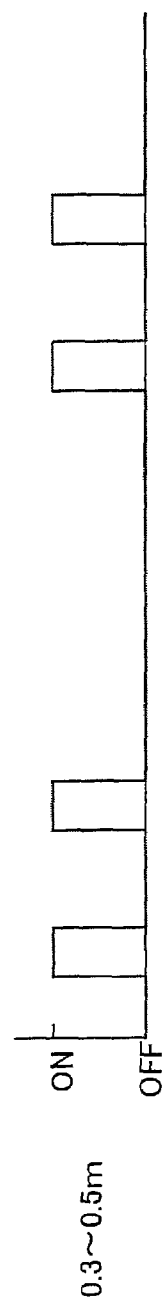
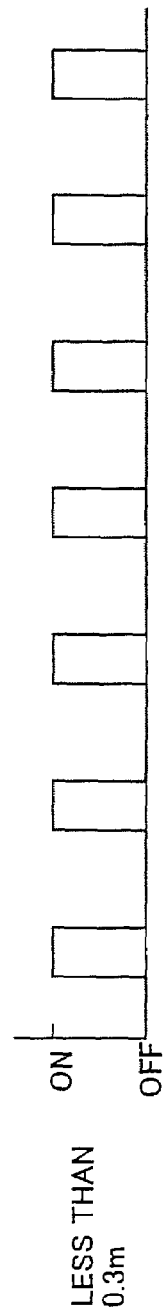
FIG. 4A  GREATER THAN 1m
FIG. 4B  0.5~1m
FIG. 4C  0.3~0.5m
FIG. 4D  LESS THAN 0.3m $R = K \cdot \exp(L/r_0)$

SURROUNDING CONDITIONS DISPLAY APPARATUS This is a patent application based on a Japanese patent application No. 2001-145616 which was filed on May 15, 2001 and which is incorporated herein by reference.

BACKGROUND OF THE INVENTION

1. Field of the Invention

The present invention relates to an apparatus for displaying the conditions of the surroundings of a movable body, and more particularly to an apparatus for capturing and displaying an image of a surrounding area which, if an obstacle is present in the surrounding area, displays on the captured image an area in which the obstacle is present.

2. Description of the Related Art

Japanese Patent Application Laid-Open (kokai) Nos. 3-85069, 2-299944, and 2000-184368 disclose conventional apparatuses for displaying surrounding conditions of a vehicle, which is a movable body. The apparatus of Japanese Patent Application Laid-Open No. 3-85069 displays a distance to an obstacle on a screen which displays an image of an area at the back of a vehicle (hereinafter referred to as a "back area image"), in such a manner that the distance is displayed in a bottom region of the screen in the form of a graph. The apparatus of Japanese Patent Application Laid-Open No. 2-299944 extracts a contour of an obstacle from a back area image of a vehicle, estimates a distant to the obstacle from the width of the contour; and colors a displayed image of the obstacle in a color corresponding to the distance to the obstacle. The apparatus of Japanese Patent Application Laid-Open No. 2000-184368 superposes a contour image of an obstacle or a symbol image on a back area image of a vehicle.

However, none of the apparatuses disclosed in the above-described patent publications display, on a back area image, an area in which an obstacle is present, because the apparatuses of Japanese Patent Application Laid-Open Nos. 2-299944 and 2000-184368 display an obstacle itself, and the apparatus of Japanese Patent Application Laid-Open No. 3-85069 merely displays, in a bottom region of a back area image, the position of a detection sensor closest to an obstacle among three detection sensors, by means of a horizontally extending bar.

However, in actuality, accurately specifying an obstacle closest to a vehicle is often difficult.

Further, for a driver who backs a vehicle while viewing the back area image, roughly displaying on the image an area in which an obstacle is present is sometimes better than accurately specifying an obstacle closest to the vehicle. Specifically, the rough display of an area including an obstacle enables the driver to know an area to which he or she must pay attention and to perform a proper collision avoiding operation before the vehicle collides with an obstacle.

Moreover, a location to which the driver must pay attention can be highlighted, when an area in which an obstacle is present is displayed in such a manner that the brightness, which represents the degree of danger (i.e., the likelihood of collision), decreases gradually from the center or origin of the area toward the periphery thereof, without clearly displaying the boundary of the area. Such display enables the driver to grasp the danger area roughly, thereby facilitating the driver's maneuvering of the vehicle while viewing the image.

SUMMARY OF THE INVENTION

The present invention has been accomplished on the basis of the above-described idea in order to solve the problems involved in the conventional apparatuses.

An object of the present invention is to provide a surrounding conditions display apparatus which displays, on a captured image of an area surrounding a movable body, an area including an obstacle in a condition which can be distinguished from other regions, to thereby enable a driver to grasp more properly an area in which the movable body may collide with an obstacle (hereinafter referred to as a "collision danger area").

Another object of the present invention is to provide a surrounding conditions display apparatus which does not clearly separate the collision danger area from the remaining area, but fades off the contour of the area, to thereby roughly inform the driver of the collision danger area and enable the driver to perform a proper collision avoiding operation without fail.

Still another object of the present invention is to provide a surrounding conditions display apparatus which superimposes on an image of the surrounding area an image which is changed continuously from the origin of the area toward the peripheral portion thereof, to thereby inform the driver of the degree of collision danger, which varies as a function of the position. Thus, the driver can recognize the degree of collision danger as a function of the position, and thus can avoid collision more reliably.

A further object of the present invention is to provide a surrounding conditions display apparatus which enables the driver to grasp the distance to an obstacle.

These objects are achieved by respective apparatuses according to a plurality of aspects of the present invention; however, the apparatuses should not be construed in such a manner that each apparatus achieves all the objects of the present invention.

In order to achieve the above objects, the present invention provides a surrounding conditions display apparatus for capturing and displaying an image of an area surrounding a movable body. The first feature of the surrounding conditions display apparatus is comprising an image capturing unit for capturing an image of an area surrounding the movable body; a distance detecting unit for detecting a distance between the movable body and an obstacle present in the area surrounding the movable body; a display unit for displaying the image captured by the image capturing unit; and a superposing unit for superposing, on the image of the surrounding area displayed on the display unit, an image of an area including the obstacle in such a manner that the area including the obstacle can be distinguished from the remaining image area and that the superposed image changes in accordance with the distance to the obstacle as detected by the distance detection unit.

The phrase "superposed on the image in such a manner that the area . . . can be distinguished" means one of the following three manners of superposition:

(1) A clear contour of arbitrary shape such as a circle, an ellipse, a rectangle, or a polygon is superposed on the image in such a manner that the area including an obstacle can be separated by the clear contour.

(2) The area including an obstacle is colored, the brightness of the area is increased at a predetermined rate, or the brightness of the image is increased by an amount obtained through multiplication of the brightness of the area by a predetermined ratio.

(3) The area including an obstacle is displayed without clear display of the contour of the area, as will be described later.

Since the area including an obstacle is displayed on the captured image of the area surrounding the movable body, a driver of the movable body can roughly grasp the area in which the obstacle is present, thereby facilitating the operation for avoiding collision with the obstacle.

Further, since an alert is provided to the driver without clear specification of the detected obstacle itself, an alert against an obstacle can be provided reliably even when the measured distance to the obstacle contains an error or a closer obstacle is not detected.

The second feature of the present invention, to be combined with the first feature, resides in that the superposing unit superposes an image in such a manner that the boundary of the area including an obstacle is displayed while being faded off.

In this case, the boundary of the area including an obstacle is not displayed clearly but is displayed unclearly, to thereby cause a driver to roughly grasp the location of the area including an obstacle. This enables the driver to roughly grasp the collision danger area. Therefore, the driver can grasp a pre-collision state, which is a state before the vehicle collides against the obstacle, and thus can properly perform a collision avoiding operation.

In order to fade off the boundary, any of the following methods, which are described in relation to the third through seventh features of the present invention, can be used.

The third feature of the present invention, to be combined with the second feature, resides in that the superposing unit may superpose on the captured image a modulation image modulated in accordance with a distance from an origin of the area including an obstacle.

Since the image to be superposed is modulated in accordance with a distance from an origin of the area including an obstacle, the driver can recognize the degree of collision danger as a function of location. As a result, the driver can properly perform a collision avoiding operation.

The fourth feature of the present invention, to be combined with the third feature, resides in that the modulation image is a color image whose brightness decreases with increasing distance from the origin of the area.

In this case, the brightness of the color image changes as a function of location, so that the color brightness decreases with increasing distance from the origin of the area. Therefore, the driver of the movable body can roughly grasp the degree of collision danger from the color brightness, and thus can properly perform an operation of avoiding collision with the obstacle.

The fifth feature of the present invention, to be combined with the third feature, resides in that the modulation image is a monochrome image whose brightness decreases with increasing distance from the origin of the area.

In contrast to the fourth feature in which the brightness (luminance) of a color image is modulated, in this case, the brightness of a monochrome image (gray image) is modulated. The area including an obstacle is displayed through an operation of changing the brightness of the area without changing the hue of the captured image of the surrounding area. As in the case of the fourth feature, the driver of the movable body can roughly grasp the degree of collision danger from the brightness, and thus can properly perform an operation of avoiding collision with the obstacle.

The sixth feature of the present invention, to be combined with the third feature, resides in that the modulation image is a color image whose brightness increases with distance from the origin of the area.

In contrast to the fourth feature, the brightness of a color image is modulated in such a manner that the brightness of the color image increases with distance from the origin of the area. Therefore, an effect similar to that attained by the fourth feature can be obtained.

The seventh feature of the present invention, to be combined with the third feature, resides in that the modulation image is a monochrome image whose brightness increases with distance from the origin of the area.

In contrast to the fifth feature, the brightness of a monochrome image is modulated in such a manner that the brightness of the color image increases with distance from the origin of the area. Therefore, an effect similar to that attained by the fifth feature can be obtained.

The eighth feature of the present invention, to be combined with any of the third through seventh features, resides in that the modulation image is an image whose characteristics remain substantially constant inside the area including an obstacle but change greatly in the vicinity of the boundary of the area.

According to the present feature, the modulation image is a color image whose brightness changes greatly in the vicinity of the boundary of the area or a monochrome image whose brightness changes greatly in the vicinity of the boundary of the area. The present feature enables the vicinity of the boundary of the area to be faded off. Therefore, the driver can roughly grasp an area in which the movable body may collide with an obstacle, and thus can perform a proper collision avoiding operation.

The ninth feature of the present invention, to be combined with the third feature, resides in that the superposing unit superposes the modulation image while changing at least one of the brightness of the modulation image, the rate of variation in brightness with the distance from the origin of the area, and the size of the area, in accordance with the distance detected by the distance detection unit.

The driver can recognize the distance between the movable body and the obstacle on the basis of at least one of the brightness of a superposed color image or monochrome image, the gradient of the brightness, and the size of the area to be superposed. For example, as the movable body approaches an obstacle, only the area including the obstacle becomes brighter, the gradient of the brightness increases and thus the boundary of the area becomes clear, or the area becomes narrower. This enables the driver to know that the movable body has approached closer to the obstacle, and to perform a collision avoiding operation without fail.

Notably, in general, uniformly increasing the gradient of brightness is equivalent to narrowing the area of the modulation image to be superposed. Further, when the gradient of brightness is increased through narrowing the width of a region in which the brightness changes, the boundary of the area becomes clearer.

The tenth feature of the present invention, to be combined with any of the fourth through eighth features, resides in that the superposing unit superposes the modulation image while changing at least one of the brightness of the modulation image at the origin of the area, the rate of variation in brightness with the distance from the origin of the area, and the size of the area, in accordance with the distance detected by the distance detection unit.

When the tenth feature is to be combined with the fourth feature, the following action and effect can be attained.

When the brightness at the origin of the area is increased with the gradient of the brightness maintained constant, the entirety of the colored area becomes brighter, which is equivalent to the area being expanded. Further, the area can be narrowed by increasing the gradient of the brightness. Moreover, the area can be narrowed by increasing the brightness at the origin of the area and by increasing the gradient of the brightness. In other words, the area can be narrowed, rendered brighter, or caused to have a clear boundary by means of changing the manner of modulation with the distance from the origin of the area. This enables the driver to know, from the display condition of the area, that the movable body has approached closer to the obstacle, and to perform a more proper collision avoiding operation.

When the tenth feature is to be combined with the fifth feature, although a monochrome image is used as a modulation image, there can be attained an action and effect similar to those obtained in the above-described case of a color modulation image being employed.

When the tenth feature is to be combined with the sixth feature, the image area outside the area including an obstacle is colored. In this case, the area can be narrowed by decreasing the brightness of the modulated color image at the origin of the area and/or by increasing the gradient of the brightness. Moreover, the boundary of the area can be made clear by increasing the gradient of the brightness. This enables the driver to know from the display condition that the movable body has approached closer to the obstacle, and to perform a more proper collision avoiding operation.

When the tenth feature is to be combined with the seventh feature, although a monochrome image is used as a modulation image, there can be attained an action and effect similar to those obtained in the above-described case of a color modulation image being employed.

The eleventh feature of the present invention, to be combined with any of the third, fourth, sixth, and tenth features, resides in that the superposing unit superposes the modulation image while changing the hue of the modulation image in accordance with the distance detected by the distance detection unit.

According to the present feature, when the modulation image is a color image, the hue of the image to be superposed changes in accordance with the distance between the movable body and the obstacle. This enables the driver to know, from the display condition of the area, that the movable body has approached closer to the obstacle, and perform a more proper collision avoiding operation.

The twelfth feature of the present invention, to be combined with any of the first through eleventh features, resides in that the superposing unit superposes the image in such a manner that the superposed image appears and disappears at intervals which change in accordance with the distance detected by the distance detection unit.

In this case, since the superposed modulation image flashes at intervals which change in accordance with the distance between the movable body and the obstacle, the driver can know without fail that the movable body has approached closer to the obstacle.

BRIEF DESCRIPTION OF THE DRAWINGS

FIGS. 4A to 4D are time charts relating to the first embodiment and each showing a manner of causing an area including an obstacle to flicker;

DESCRIPTION OF THE PREFERRED EMBODIMENTS

The present invention will now be described with reference to preferred embodiments; however, the present invention is not limited to the embodiments.

First Embodiment:

An apparatus according to a first embodiment is configured to capture the image of an area at the back of a vehicle (movable body) so as to display the back area image, and to display an area including an obstacle on the back area image to thereby provide an alert to a driver.

Figure 1:
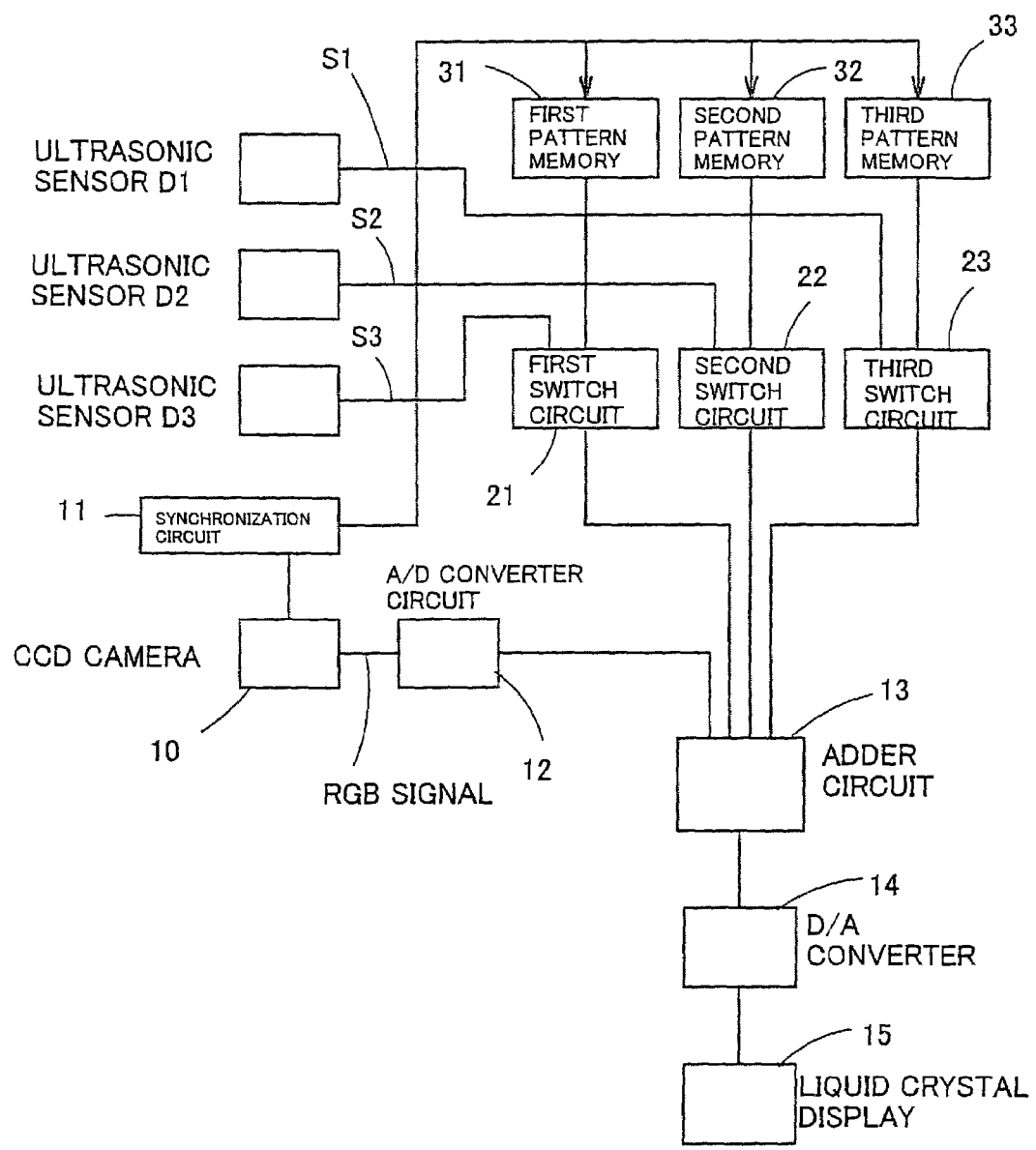
FIG. 1 is a block diagram of a surrounding conditions display apparatus according to a first embodiment of the present invention.
Figure 2:
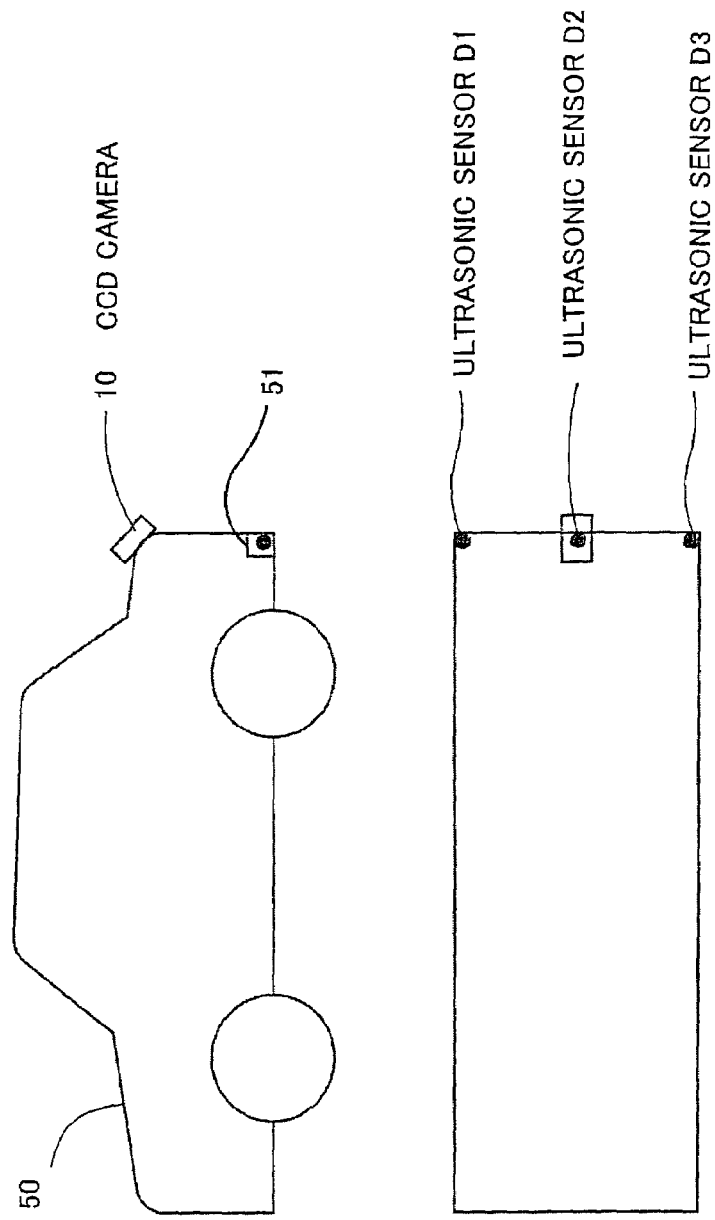
FIG. 2 is a side and upper view of a vehicle relating to the first embodiment and showing the positions of a CCD camera and ultrasonic sensors disposed on the vehicle.

FIG. 1 is a block diagram showing the configuration of a surrounding conditions display apparatus according to the present embodiment. FIG. 2 is a side view of a vehicle showing the positions of a CCD camera (image capturing unit) and ultrasonic sensors (distance detection unit) used in the present apparatus.

Figure 5:
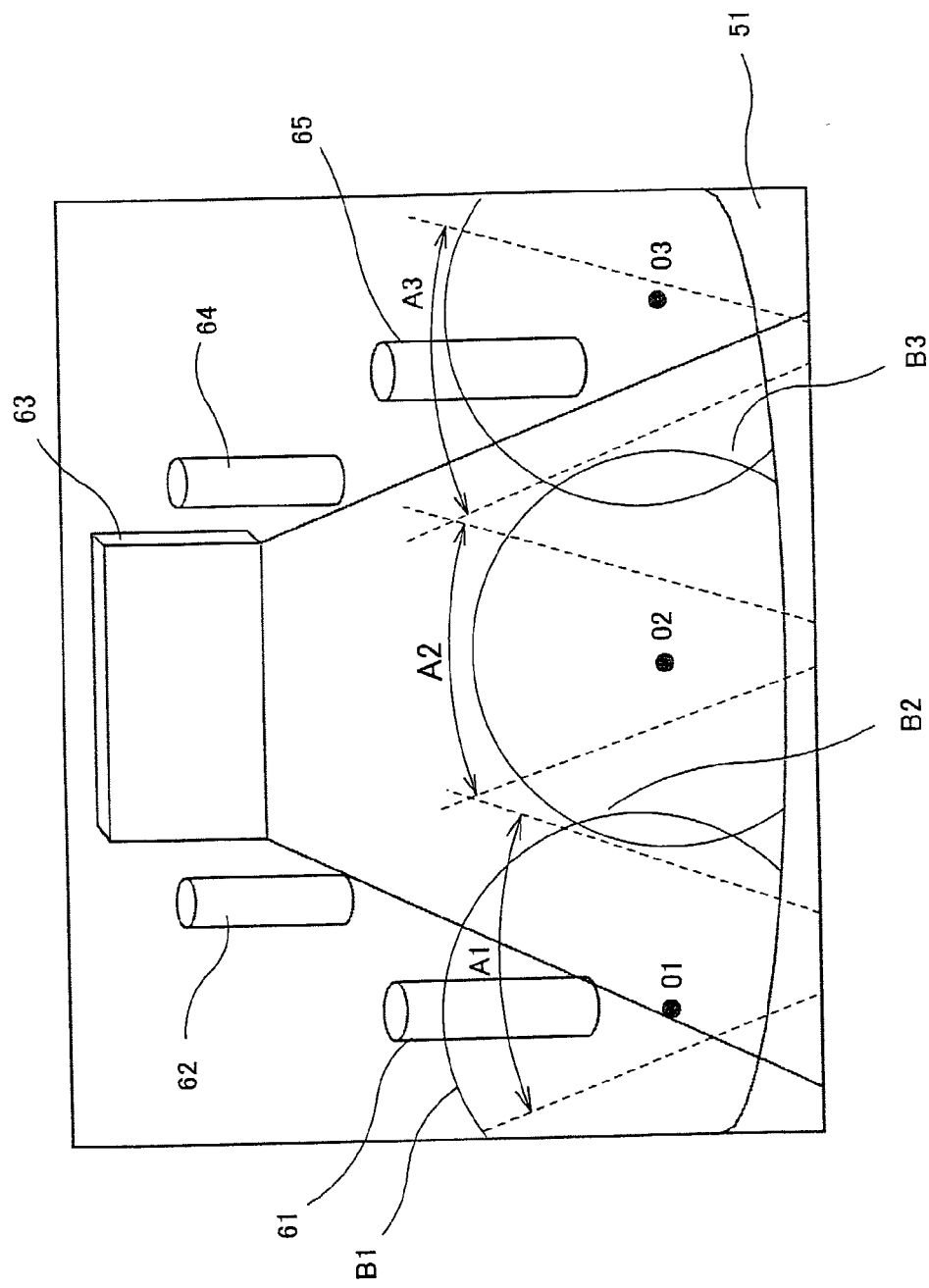
FIG. 5 is an explanatory view relating to the first embodiment and showing an area display obtained through superposition of a modulation image on a captured image.

In FIG. 2, a CCD camera 10 is disposed on the trunk lid of a vehicle 50 in an inclined condition such that the optical axis of the CCD camera 10 is directed to the road surface, whereby the CCD camera 10 can capture the image of a road surface area at the back of the vehicle. FIG. 5 shows an image of the back area captured by the CCD camera 10. In FIG. 5, reference numerals 61 to 65 denote obstacles standing on the road surface. Reference numeral 51 denotes the rear bumper of the vehicle 50. Ultrasonic sensors D1, D2, and D3, each adapted to detect the distance to an obstacle at the back of the vehicle 50, are disposed on the rear bumper 51. Each of the ultrasonic sensors D1, D2, and D3 measures the distance to an obstacle on the basis of reflection of ultrasonic waves. The ultrasonic sensors D1, D2, and D3 are provided at the left end, at the center, and at the right end of the rear bumper 51, respectively. As shown FIG. 5, these sensors D1, D2, and D3 have respective detection areas A1, A2, and A3. When an obstacle is present in one of the detection areas A1, A2, and A3, the distance to the obstacle is measured by the corresponding ultrasonic sensor D1, D2, or D3.

Figure 6A:
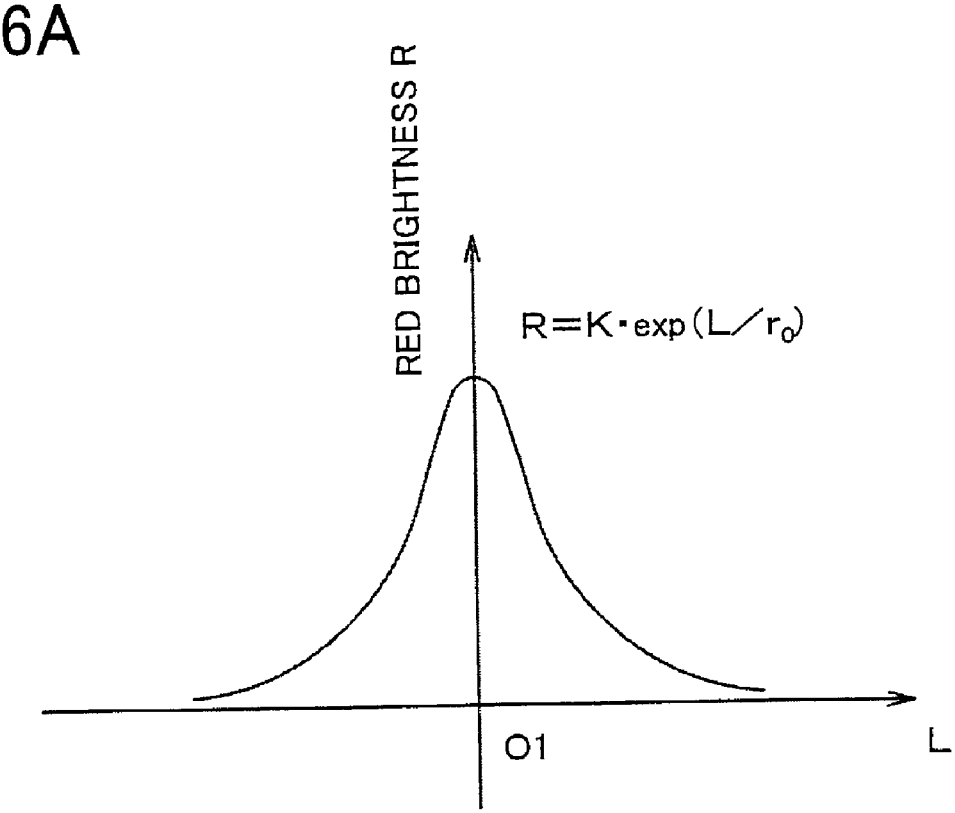
FIGS. 6A and B are characteristic diagrams relating to the first embodiment and showing a change in brightness with distance from the origin of an area, which characteristic is used for generation of the modulation image.
Figure 6B:
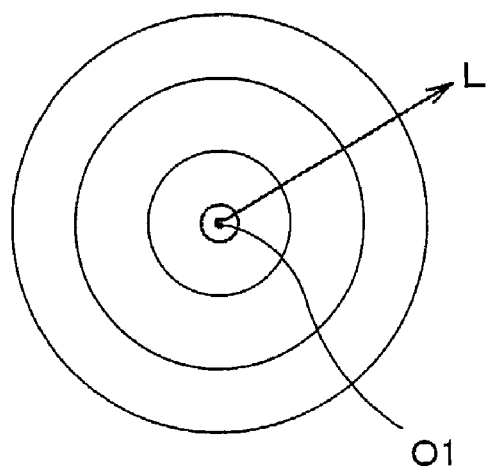

When the ultrasonic sensor D1 detects the obstacle 61, a circular area B1 is displayed on the image of the back area. The area B1 is displayed through superposition, on the captured image, of a red modulation image whose brightness decreases gradually with distance L from the origin O1 of the area B1, as shown in FIGS. 6A and 6B. The red-color brightness R is expressed by the following expression.

$$R = k \cdot \exp(-L/r_0) \quad (1)$$

where k and $r_0$ are constants.

Similarly, when the ultrasonic sensor D2 or D3 detects an obstacle, a circular area B2 or B3 is displayed on the image of the back area. Each of the areas B2 and B3 is displayed through superposition, on the captured image, of a red modulation image whose brightness decreases gradually in accordance with Expression (1) with distance L from the origin O2 of the area B2 or the origin O3 of the area B3, as shown in FIGS. 6A and 6B.

In FIG. 1, distance detection signals output from the ultrasonic sensors D1, D2, and D3 are input to switch circuits 21, 22, and 23, respectively. Further, pattern memories 31, 32, 33 each store, in bit map form, a red modulation image which is to be superposed on the captured image and whose brightness changes gradually in accordance with Expression (1). The pattern memories 31, 32, 33 each store the modulation image as RGB data (data regarding the three primary colors). The pattern memory 31 stores a modulation image to be superposed on the captured image when the ultrasonic sensor D1 detects an obstacle. The pattern memory 32 stores a modulation image to be superposed on the captured image when the ultrasonic sensor D2 detects an obstacle. The pattern memory 33 stores a modulation image to be superposed on the captured image when the ultrasonic sensor D3 detects an obstacle. As shown in FIG. 6B, each of the modulation images is a circular red image whose brightness decreases exponentially with the distance from the origin as shown in FIG. 6A.

The CCD camera 10 receives a synchronous signal from a synchronization circuit 11, and outputs to an A/D converter circuit 12 three RGB signals corresponding to the three primary colors. The A/D converter circuit 12 is composed of three converters for converting the three RGB signals to corresponding digital RGB signals. The digital RGB signals output from the A/D converter circuit 12 are fed to an adder circuit 13, which is composed of three adders corresponding to the three digital RGB signals.

Meanwhile, signals S1, S2, and S3 output from the ultrasonic sensors D1, D2, and D3 and each representing a distance to an obstacle are fed to the switch circuits 21, 22, and 23. In synchronism with the output signal of the synchronization circuit 11, the pattern memories 31, 32, and 33 output respective modulation-image data sets to the switch circuits 21, 22, and 23. As shown in FIGS. 4A to 4D, the switch circuits 21, 22, and 23 change the ratio between periods for permitting passage of modulation image data from the pattern memories 31, 32, and 33 and periods for prohibiting passage of the modulation image data, in accordance with the distance signals S1, S2, and S3.

The respective RGB data sets (modulation images) having passed through the switch circuits 21, 22, and 23 are fed to the adder circuit 13 and are added to the RGB signals output from the A/D converter circuit 12. Addition processing is executed for each of the three primary colors; i.e., red, green, and blue. The RGB data sets output from the adder circuit 13 are fed to a D/A converter circuit 14 consisting of three D/A converters and are converted to analog signals for red, green, and blue by the respective D/A converters. The thus-obtained analog signals are fed to a liquid crystal display 15. The D/A converter circuit 14 and the liquid crystal display 15 constitute a display unit. The pattern memories 31 to 33, the switch circuits 21 to 23, and the adder circuit 13 constitute a superposing unit.

Next, operation of the apparatus according to the present embodiment will now be described.

When the vehicle is backed, an image of the back area captured by the CCD camera 10 is displayed on the screen of the liquid crystal display 15. When none of the ultrasonic sensors D1 to D3 detects an obstacle within a 1 m range from the rear bumper 51, the switch circuits 21 to 23 each enter an off state. As a result, modulation image data are not output from the switch circuits 21 to 23 (a zero output state). The RGB signals output from the CCD camera 10 are converted to corresponding digital signals by the A/D conversion circuit 12, and the outputs (zero) of the switch circuits 21 to 23 are added to the digital signals by the adder circuit 13. The resultant signals are fed to the D/A converter circuit 14. Therefore, the image captured by the CCD camera 10 is displayed on the liquid crystal display 15 as is.

Figure 3A:
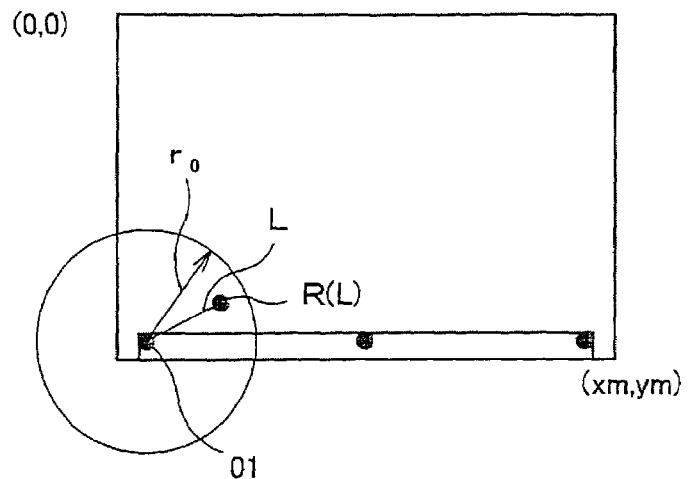
FIGS. 3A to 3C are explanatory views relating to the first embodiment and each showing a position at which a modulation image is superposed on a captured image.

When one of the ultrasonic sensors D1 to D3 detects an obstacle within a 1 m range from the rear bumper 51, the corresponding switch circuit enters an active state. In an example case in which the ultrasonic sensor D1 detects the obstacle 61 within a range of 0.5 m to 1 m from the rear bumper 51, the switch circuit 21 repeatedly enters ON and OFF states at intervals as shown in FIG. 4B. With this operation, the modulation image data which are output from the pattern memory 31 in synchronism with the output signal of the CCD camera 10 pass through the switch circuit 21 only when the switch circuit 21 is in the ON state. Notably, each of the ON periods is much longer than a time (16.7 msec) required to output a single frame of an image. Each of the ON periods is about 0.5 sec, for example. As a result, a modulation image is superposed on the captured image only during the ON periods of the switch circuit 21. The position on the captured image at which the modulation image is superposed upon detection of an obstacle by the ultrasonic sensor D1 has been determined in advance as shown in FIG. 3A. As shown in FIGS. 6A and 6B, the modulation image has a brightness profile such that the brightness of red is constant in the circumferential direction but decreases exponentially in the radial direction with the distance L from the area origin. As shown in FIG. 3A, about one-quarter of such a circular modulation image is superposed on the captured image. Since the brightness of the modulation image changes as shown in FIG. 6A, the area has a faded-off boundary rather than a clear boundary. Specifically, as shown in FIG. 3A, the circular area at the lower left corner of the captured image is colored red in such a manner that the brightness of red decreases radially outward. During the OFF periods of the switch circuit 21, the modulation image data are not output from the switch circuit 21.

Therefore, the red area disappears from the captured image, and the image captured by the CCD camera 10 is displayed on the liquid crystal display 15 as is. Such a display operation is repeated as shown in FIG. 4B. That is, the red area flickers on the captured image.

When the vehicle moves backward and the ultrasonic sensor D1 detects the obstacle 61 within a range of 0.3 m to 0.5 m from the rear bumper 51, the switch circuit 21 repeatedly enters ON and OFF states at intervals as shown in FIG. 4C. As a result, the above-described red area flickers at shorter intervals. When the vehicle moves backward further and the ultrasonic sensor D1 detects the obstacle 61 within 0.3 m from the rear bumper 51, the switch circuit 21 repeatedly enters ON and OFF states at intervals as shown in FIG. 4D. As a result, the above-described red area flickers at intervals shorter than those in the above-described case. As described above, the modulation image superposed on the captured image flickers, and the flickering intervals become shorter as the vehicle approaches an obstacle, thereby showing the driver the degree of proximity of the vehicle to the obstacle.

Figure 3B:
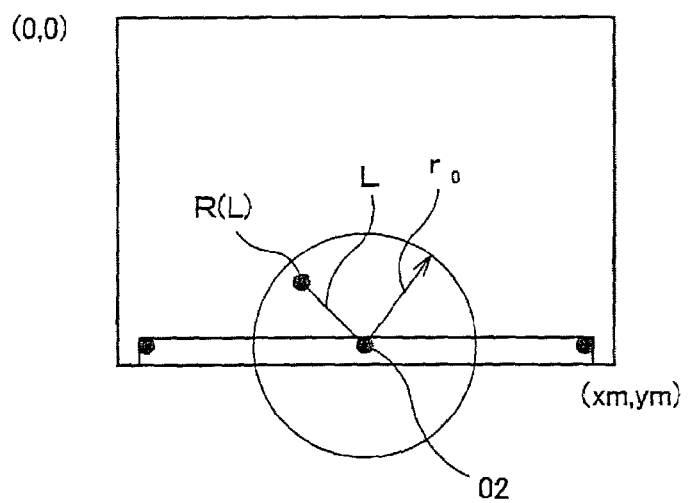
Figure 3C:
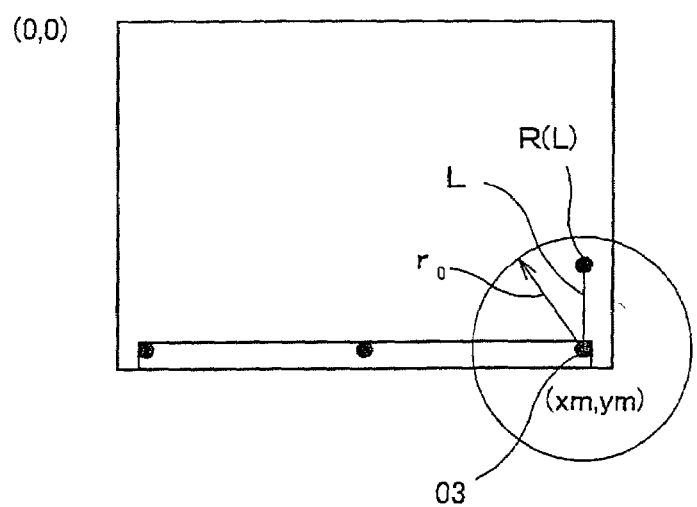

When the ultrasonic sensor D2 detects an obstacle, the modulation image is superposed on the captured image at a position shown in FIG. 3B. Specifically, about one-half of a circular area is displayed at the center bottom of the screen. As in the case described above, the flickering intervals of the area display become shorter as the vehicle approaches the obstacle. When the ultrasonic sensor D3 detects an obstacle, the modulation image is superposed on the captured image at a position shown in FIG. 3C. Specifically, about one-quarter of a circular area is displayed at the lower right corner of the screen. As in the case described above, the flickering intervals of the area display become shorter as the vehicle approaches the obstacle. When two or more of the ultrasonic sensors D1 to D3 simultaneously detect objects, as shown in FIG. 5, red areas are displayed on the screen at positions corresponding to the sensors such that they flicker at respective intervals corresponding to the distances to the respective obstacles.

As described above, in the present embodiment, a red modulation image whose brightness decreases in the radial direction is superposed on the captured image, whereby an area including an obstacle is displayed. Since the red brightness of the area decreases with the distance from the origin of the area, the boundary of the area is seen to have been faded off. The driver can recognize the possibility of collision (the degree of danger) in the area surrounding an obstacle on the basis of the brightness of the red image, thereby enabling the driver to perform a collision avoiding operation without fail before the vehicle collides with the obstacle.

In the above-described embodiment, an area including an obstacle is displayed in red. However, any color may be used to display such an area.

Figure 7:
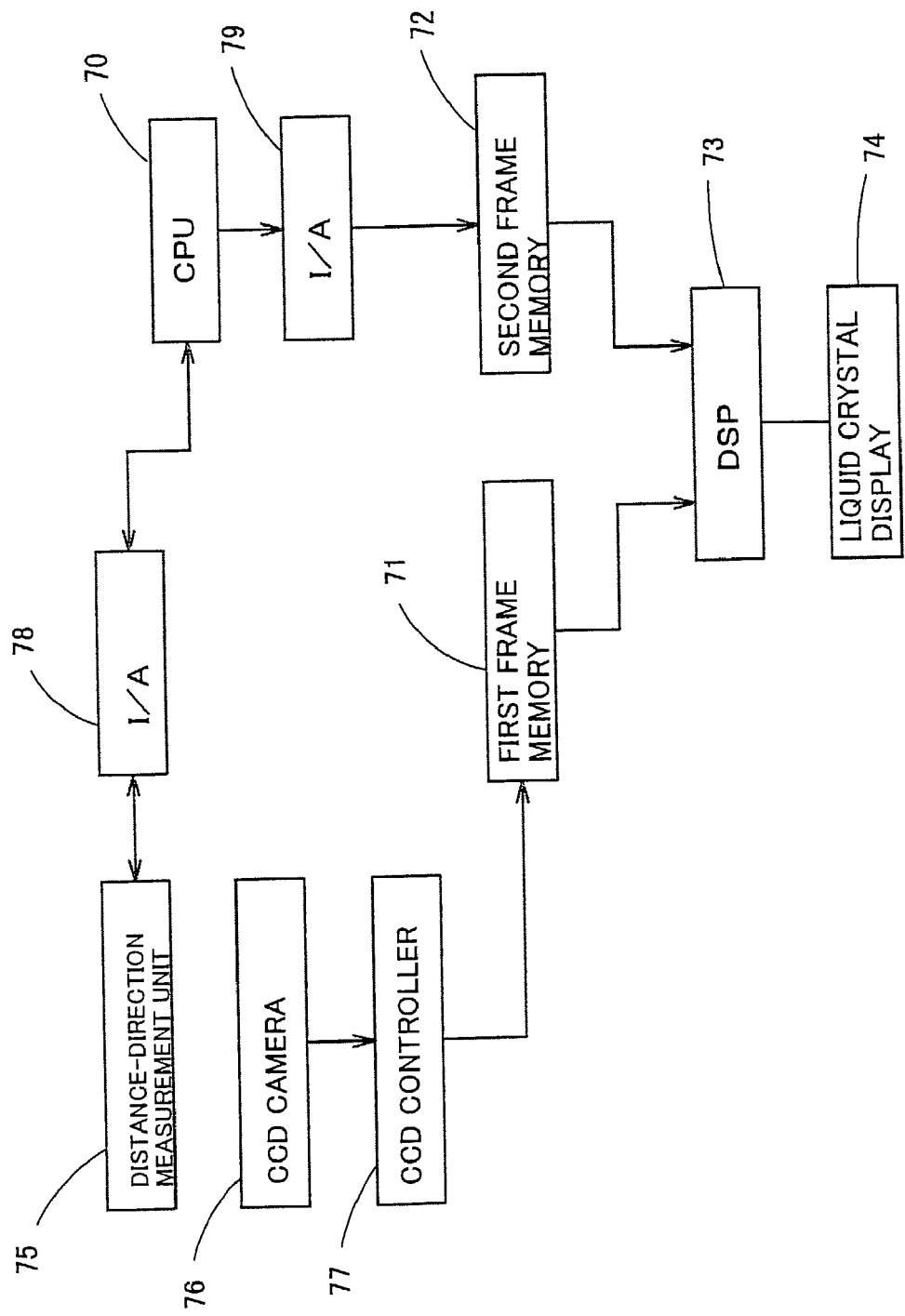
FIG. 7 is a block diagram of a surrounding conditions display apparatus according to a second embodiment of the present invention.

Second Embodiment:

A second embodiment will now be described with reference to FIG. 7.

An apparatus of the present embodiment is formed by a computer system. A distance-direction measurement unit 75 measures a distance to an obstacle and the direction to the obstacle on the basis of reflection of electromagnetic waves generated by, for example, a radar system or a laser radar system. The distance-direction measurement unit 75 outputs digital data representing the measured distance and direction. The digital data are supplied to a CPU 70 via an interface 78. A CCD controller 77 scans an imaged captured by a CCD camera 76 in order to obtain a RGB value for each pixel, which is then stored in first frame memory 71. On the basis of the image data of a single frame stored in the first frame memory 71, a DSP (digital signal processor) 73 outputs a display signal to a liquid crystal display 74, whereby the captured image is displayed in real time. The CPU 70 generates a modulation image to be superposed on the captured image, on the basis of the data output from the distance-direction measurement unit 75 and representing the measured distance and direction. The modulation image is stored in a second frame memory 72 via an interface 79. The DSP 73 adds, in real time, the modulation image stored in the second frame memory 72 to the captured image stored in the first frame memory 71, in order to display a composite image on the liquid crystal display 74. By virtue of the above configuration, the modulation image can be superposed on the captured image without synchronization therewith; and the generation interval of the modulation image can be made much longer than the interval at which the CCD camera 76 outputs a single frame of image.

Figure 8:
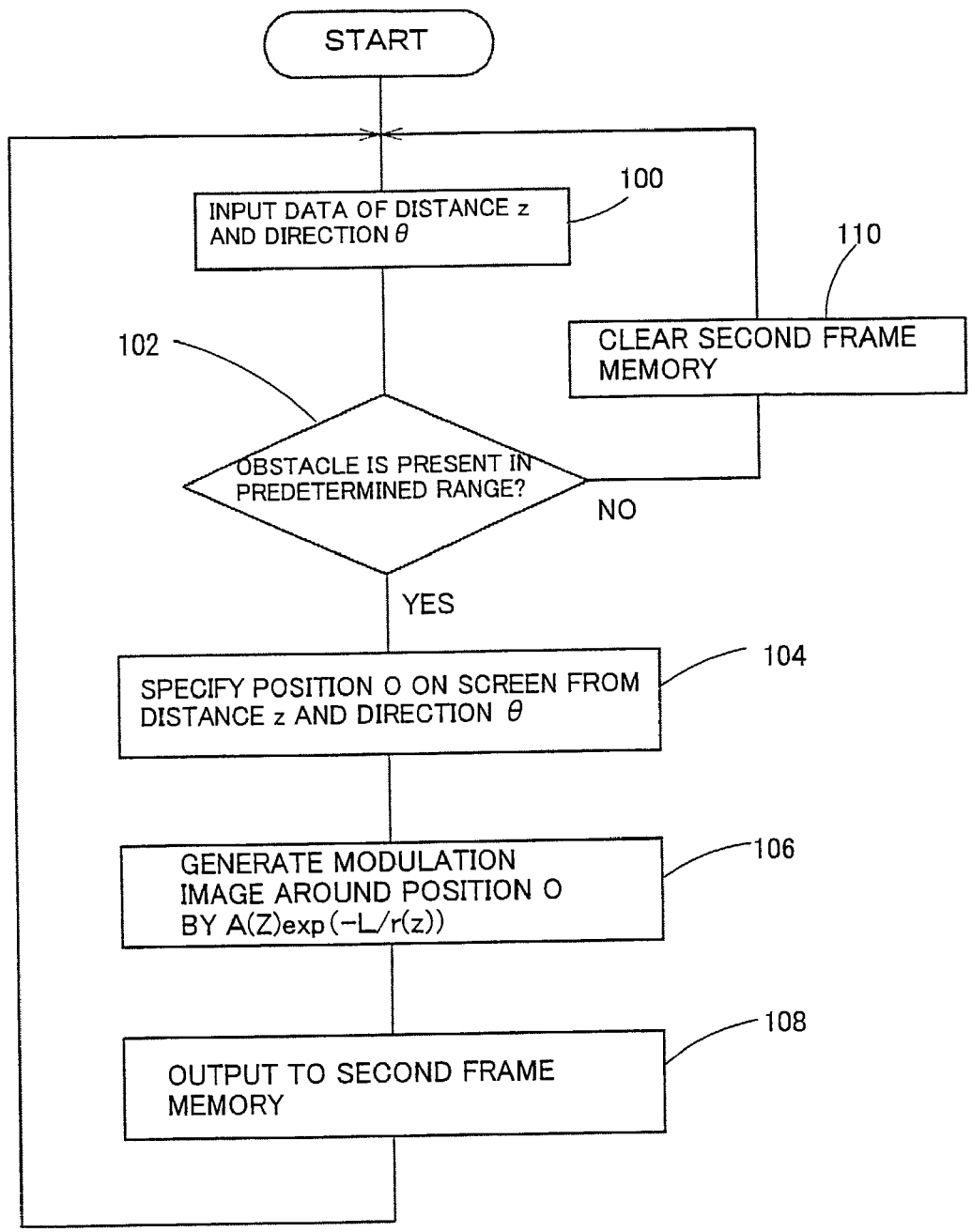
FIG. 8 is a flowchart relating to the second embodiment and showing the processing steps of the CPU.

Next, the processing steps of the CPU 70 will be described with reference to the flowchart of FIG. 8. In step 100, data representing the distance z and the direction θ to an obstacle are input from the distance-direction measurement unit 75. In subsequent step 102, the CPU 70 judges, on the basis of the distance z and the direction θ, whether an obstacle is present in a predetermined range behind the vehicle. The predetermined range is an area where an alert must be provided to the driver. When having judged that no obstacle is present within the predetermined range, the CPU 70 clears the second frame memory 72 in step 110, and then returns to step 100 in order to receive the distance-direction data from the distance-direction measurement unit 75 at the next timing.

When having judged, in step 102, that an obstacle is present within the predetermined range, in subsequent step 104, the CPU 70 determines the position o of the obstacle on the captured image from the distance z and the direction θ. Subsequently, the CPU 70 proceeds to step 106 and generates a modulation image in accordance with the following expression.

$$I = A(z) \times \exp[\cdot L/r(z)] \quad (2)$$

where L is distance from the position O of the obstacle, and A(z) and r(z) are coefficients which vary with the distance z to the obstacle.

Figure 9:
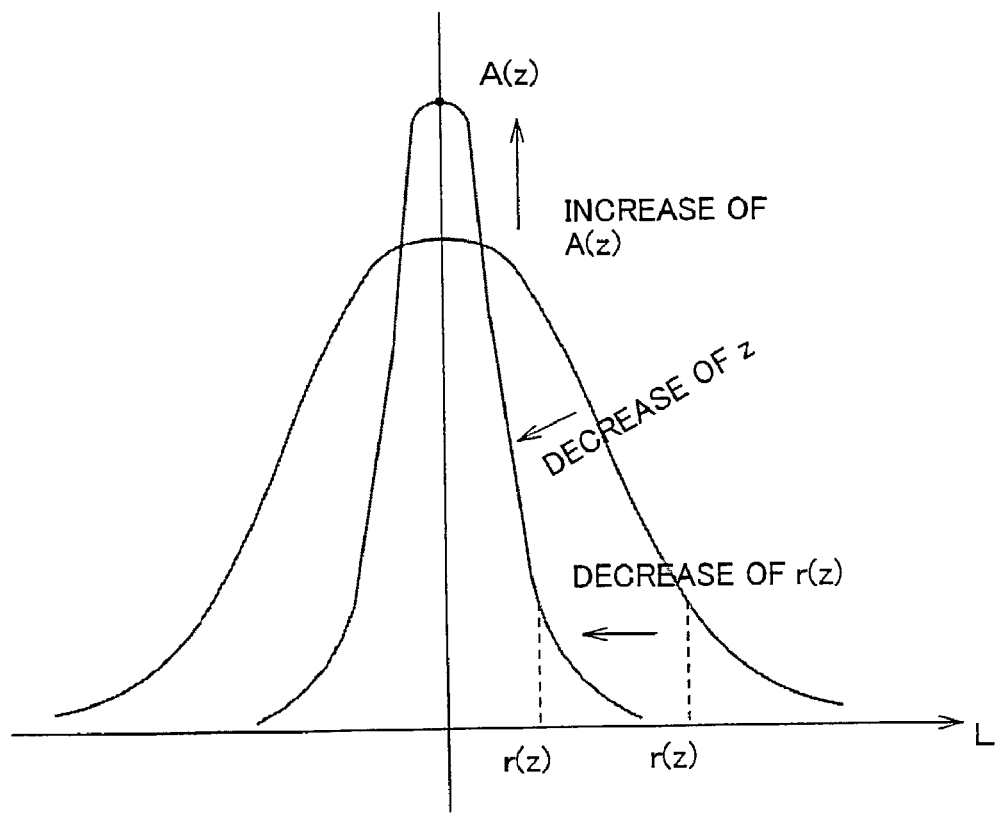
FIG. 9 is a characteristic diagram relating to the second embodiment and showing a change in brightness with distance from the origin of an area, which characteristic is used for generation of the modulation image.

As shown in FIG. 9, brightness decreases exponentially with the distance L from the origin of the area. Further, as the distance z between the vehicle and the obstacle decreases, the brightness A(z) at the origin increases, and the attenuation distance r(z) decreases. Therefore, as the distance z to the obstacle decreases, the size of the area displayed on the captured image decreases, and the brightness at the origin increases. Therefore, the gradient in brightness with the distance L increases. Through generation of such a modulation image, it becomes possible to increase the brightness of the area, narrow the area, and make the area boundary clearer as the vehicle approaches the obstacle. This enables the driver to recognize the degree of proximity to the obstacle with greater accuracy.

In step 108, the CPU 70 outputs the thus-generated modulation image to the second frame memory 72, whereby the modulation image is superposed on the captured image.

Through repetition of the above-described processing, when an obstacle is present within the predetermined range, a modulation image is generated and superposed on the captured image. Since generation of the modulation image is not required to be synchronized with generation of the captured image, the degree of freedom in relation to the generation of the modulation image increases. The apparatus of the present embodiment may be modified in such a manner that when a plurality of obstacles are detected within the predetermined range, a plurality of modulation images including the respective obstacles are generated in order to display a plurality of areas on the captured image. The apparatus of the present invention may be modified in such a manner that in step 108 the CPU 70 repeats, at intervals corresponding to the distance z to an obstacle, the operation of outputting to the second frame memory 72 the modulation image obtained in step 106 and the operation of clearing the second frame memory 72. By virtue of this modification, the modulation image changes with the distance z to the obstacle, and the area flickers at intervals corresponding to the distance z. Thus, the driver can recognize the vehicle's approach to the obstacle with greater precision.

Notably, in the above-described embodiment, the color of the modulation image is arbitrary. Further, the modulation image can be colored gray through adjustment of the brightnesses of red, green, and blue.

Further, the ultrasonic sensors D1 to D3 used in the first embodiment can be used as the distance-direction measurement unit 75.

In the second embodiment, the CCD camera 76 and the CCD controller 77 constitute an image capturing unit; the distance-direction measurement unit 75 constitutes a distance detection unit; and the liquid crystal display 74 constitutes a display unit. The CPU 70, the first and second frame memories 71 and 72, and the DSP 73 constitute a superposing unit.

Modifications:

The following modifications can be applied to each of the above-described embodiments.

Figure 10:
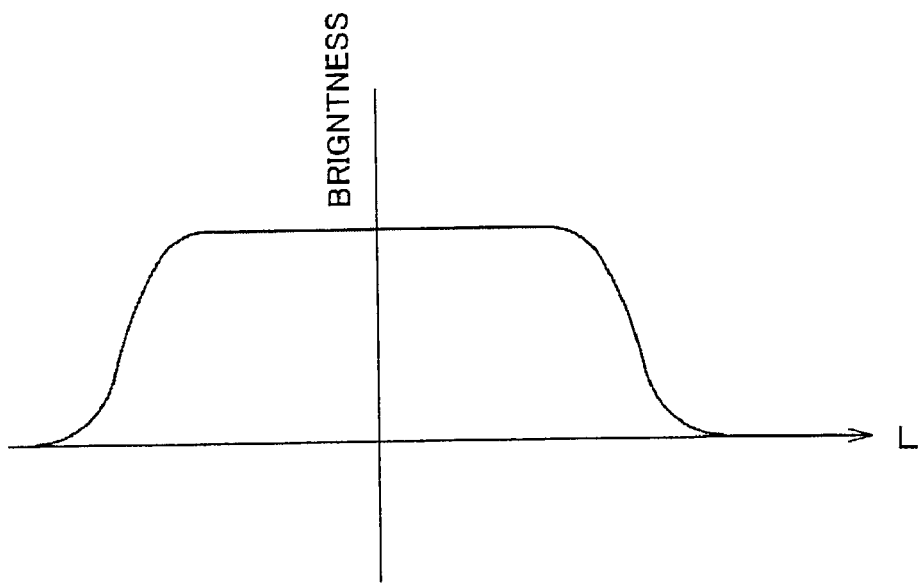
FIG. 10 is a characteristic diagram showing a change in brightness with distance from the origin of an area, which characteristic is used for generation of a modulation image in a surrounding conditions display apparatus according to a modification.

1) As shown in FIG. 10, the brightness of a modulation image may be changed with the distance L from the area origin in such a manner that the brightness changes only in the vicinity of the boundary.

Figure 11:
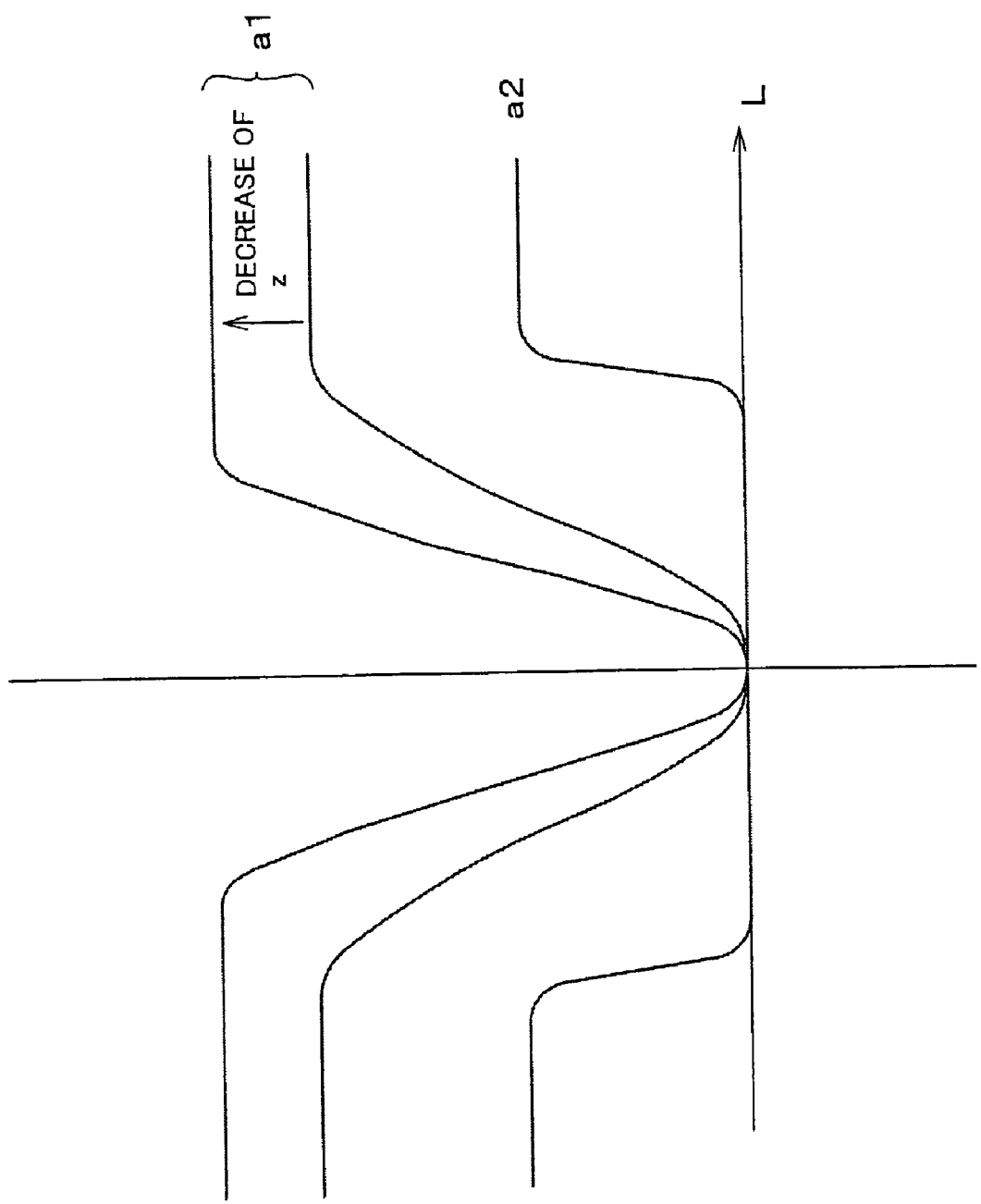
FIG. 11 is a characteristic diagram showing a change in brightness with distance from the origin of an area, which characteristic is used for generation of a modulation image in a surrounding conditions display apparatus according to another modification.

2) Instead of an area including an obstacle being colored, the remaining area may be colored. Specifically, the modulation image may be generated to have a profile represented by curves al of FIG. 11, which profile is substantially the inverse of the profile shown in FIG. 9. In an area including an obstacle, a captured image is displayed as is, and the area is colored gradually with increasing distance from the obstacle. Further, the saturation brightness outside the area, the gradient of brightness, and the size of the area may be changed in accordance with the distance z to the obstacle. The modulation image may be generated to have a profile represented by a curve a2 of FIG. 11, which profile is substantially the inverse of the profile shown in FIG. 10.

3) The hue of the modulation image may be changed in accordance with the distance z to an obstacle.

4) The brightness of the modulation image may be changed in accordance with the distance z to an obstacle.

Figure 12:
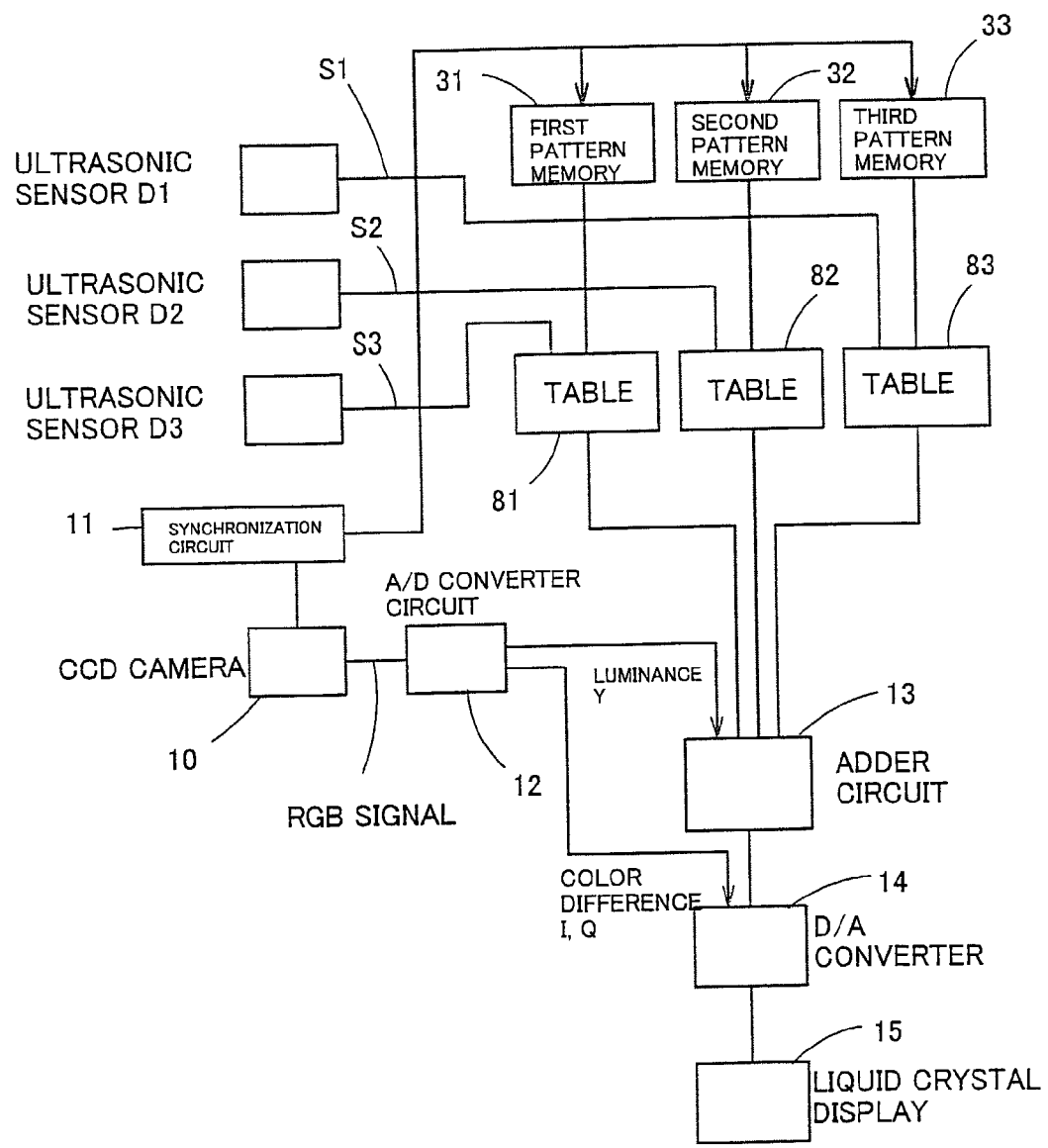
FIG. 12 is a block diagram of a surrounding conditions display apparatus according to still another modification.
Figure 13:
FIG. 13 is a characteristic diagram showing the characteristic of brightness modulation performed by the apparatus of FIG. 12.

FIG. 12 shows the configuration of an apparatus which realizes this modification. Components identical with those of FIG. 1 are denoted by the same reference numerals. Tables 81, 82, and 83 each store a weight w which varies with the distance z to an obstacle, as shown in FIG. 13. Weights w are obtained from distances z detected by the ultrasonic sensors D1, D2, and D3, respectively. The brightness values output from the pattern memories 31, 32, and 33 are multiplied by the weights w. The adder circuit 13 adds the multiplied brightness values to the luminance Y output from the CCD camera 10. Thus, the brightness is modulated in accordance with the detected distance z. Since color difference signals I and Q are fed to the D/A converter circuit 14 as they are, the color differences are not modulated. The brightness modulation may be effected in this manner.

5) Instead of an image of an area at the back of a vehicle, an area in front of or at a side of the vehicle may be captured.

6) The distance detection unit is formed by an apparatus capable of directly measuring the distance and direction to an obstacle on the basis of reflection of ultrasonic waves or radar waves. However, the distance detection unit may be formed by an apparatus capable of measuring the distance to an obstacle on the basis of the width of a contour of an obstacle as described in Japanese Patent Application Laid-Open No. 2-299944. Moreover, the distance and direction to an obstacle may be measured through an operation of capturing a stereo image by use of two image capturing units and analyzing the captured image so as to measure the distance and direction to an obstacle.

7) The present invention can be applied to an arbitrary movable body such as vehicle; in particular, to an automobile or the like.

Obviously, numerous modifications and variations of the present invention are possible in light of the above teachings. It is therefore to be understood that within the scope of the appended claims, the present invention may be practiced otherwise than as specifically described herein.

What is claimed is:

1. A surrounding conditions display apparatus for capturing and displaying an image of an area surrounding a movable body, comprising:
   an image capturing unit for capturing an image of an area surrounding the movable body;
   a distance detecting unit for detecting a distance between the movable body and an obstacle present in the area surrounding the movable body;
   a display unit for displaying the image captured by the image capturing unit; and
   a superposing unit for superposing, on the image of the surrounding area displayed on the display unit, an image of an area including the obstacle in such a manner that the area including the obstacle can be distinguished from the remaining image area and that the superposed image changes in accordance with the distance to the obstacle as detected by the distance detection unit,
   wherein the superposing unit superposes an image in such a manner that the boundary of the area including the obstacle is displayed while being faded off.

2. A surrounding conditions display apparatus according to claim 1, wherein the superposing unit superposes on the captured image a modulation image modulated in accordance with a distance from an origin of the area including the obstacle.

3. A surrounding conditions display apparatus according to claim 2, wherein the modulation image is a color image whose brightness decreases with increasing distance from the origin of the area.

4. A surrounding conditions display apparatus according to claim 3, wherein the modulation image is an image whose characteristics remain substantially constant inside the area including an obstacle but change greatly in the vicinity of the boundary of the area.

5. A surrounding conditions display apparatus according to claim 3, wherein the superposing unit superposes the modulation image while changing at least one of the brightness of the modulation image at the origin of the area, the rate of variation in brightness with distance from the origin of the area, and the size of the area, in accordance with the distance detected by the distance detection unit.

6. A surrounding conditions display apparatus according to claim 3, wherein the superposing unit superposes the modulation image while changing the hue of the modulation image in accordance with the distance detected by the distance detection unit.

7. A surrounding conditions display apparatus according to claim 2, wherein the modulation image is a monochrome image whose brightness decreases with increasing distance from the origin of the area.

8. A surrounding conditions display apparatus according to claim 2, wherein the modulation image is a color image whose brightness increases with increasing distance from the origin of the area.

9. A surrounding conditions display apparatus according to claim 8, wherein the modulation image is an image whose characteristics remain substantially constant inside the area including an obstacle but change greatly in the vicinity of the boundary of the area.

10. A surrounding conditions display apparatus according to claim 8, wherein the superposing unit superposes the modulation image while changing at least one of the brightness of the modulation image at the origin of the area, the rate of variation in brightness with distance from the origin of the area, and the size of the area, in accordance with the distance detected by the distance detection unit.

11. A surrounding conditions display apparatus according to claim 8, wherein the superposing unit superposes the modulation image while changing the hue of the modulation image in accordance with the distance detected by the distance detection unit.

12. A surrounding conditions display apparatus according to claim 2, wherein the modulation image is a monochrome image whose brightness increases with increasing distance from the origin of the area.

13. A surrounding conditions display apparatus according to claim 2, wherein the modulation image is an image whose characteristics remain substantially constant inside the area including the obstacle but change greatly in the vicinity of the boundary of the area.

14. A surrounding conditions display apparatus according to claim 13, wherein the superposing unit superposes the modulation image while changing at least one of the brightness of the modulation image at the origin of the area, the rate of variation in brightness with distance from the origin of the area, and the size of the area, in accordance with the distance detected by the distance detection unit.

15. A surrounding conditions display apparatus according to claim 2, wherein the superposing unit superposes the modulation image while changing at least one of the brightness of the modulation image, the rate of variation in brightness with distance from the origin of the area, and the size of the area, in accordance with the distance detected by the distance detection unit.

16. A surrounding conditions display apparatus according to claim 2, wherein the superposing unit superposes the modulation image while changing the hue of the modulation image in accordance with the distance detected by the distance detection unit.

17. A surrounding conditions display apparatus according to claim 2, wherein the superposing unit superposes the image in such a manner that the superposed image appears and disappears at intervals which change in accordance with the distance detected by the distance detection unit.

18. A surrounding conditions display apparatus according to claim 1, wherein the superposing unit superposes the image in such a manner that the superposed image appears and disappears at intervals which change in accordance with the distance detected by the distance detection unit.

19. A surrounding conditions display apparatus for capturing and displaying an image of an area surrounding a movable body, comprising:
   an image capturing unit for capturing an image of an area surrounding the movable body;
   a distance detecting unit for detecting a distance between the movable body and an obstacle present in the area surrounding the movable body;
   a display unit for displaying the image captured by the image capturing unit; and
   a superposing unit for superposing, on the image of the surrounding area displayed on the display unit, an image of an area including the obstacle in such a manner that the area including the obstacle can be distinguished from the remaining image area and that the superposed image changes in accordance with the distance to the obstacle as detected by the distance detection unit,
   wherein the superposing unit superposes the image in such a manner that the superposed image appears and disappears at intervals which change in accordance with the distance detected by the distance detection unit.

* * * * *

UNITED STATES PATENT AND TRADEMARK OFFICE
CERTIFICATE OF CORRECTION

PATENT NO.       : 7,126,460 B2
APPLICATION NO.  : 10/145042
DATED            : October 24, 2006
INVENTOR(S)      : Keiichi Yamada It is certified that error appears in the above-identified patent and that said Letters Patent is hereby corrected as shown below:

Title page, item 57, line 4 of the Abstract, change "are" to --area--.

Column 14, line 4, change "image," to --image at the origin of the area,--.

Signed and Sealed this

Twenty-second Day of May, 2007

JON W. DUDAS
*Director of the United States Patent and Trademark Office*